United States Patent [19]
Rinkenberger et al.

[11] Patent Number: 6,044,458
[45] Date of Patent: Mar. 28, 2000

[54] SYSTEM FOR MONITORING PROGRAM FLOW UTILIZING FIXWORDS STORED SEQUENTIALLY TO OPCODES

[75] Inventors: Glenn Eric Rinkenberger, Austin, Tex.; William K. Oh, Gilbert, Ariz.; David Michael Harrison, Mesa, Ariz.; Chuckwudi Perry, Scottsdale, Ariz.

[73] Assignee: Motorola, Inc., Schaumburg, Ill.

[21] Appl. No.: 08/989,673

[22] Filed: Dec. 12, 1997

[51] Int. Cl.⁷ .................................................. G06F 11/28
[52] U.S. Cl. ................................ 712/227; 714/51; 714/52
[58] Field of Search ............................... 712/227; 714/49, 714/51, 50, 52, 732

[56] References Cited

U.S. PATENT DOCUMENTS

| | | | |
|---|---|---|---|
| 4,074,229 | 2/1978 | Prey | 714/52 |
| 4,108,359 | 8/1978 | Proto | 714/732 |
| 5,339,261 | 8/1994 | Adelson et al. | 714/47 |
| 5,355,469 | 10/1994 | Sparks et al. | 714/38 |

OTHER PUBLICATIONS

An article entitled "R2 Response To X2 Tasking, Automatic Control Flow Monitor For The ARM Processor: Task 1—Cost/Benefit Analysis" by Elizabeth C. Ward Jun. 24, 1996 from Office of INFOSEC Research and Technology—INFOSEC Engineering Division.

An article entitled "Automatic Control Flow Monitoring (ACFM) For The ARM6: The Post Processor Report", Paul M. Johnson, Anthony C. Sheller, Elizabeth C. Ward from Internal Document, National Security Agency on Dec. 9, 1996.

An article entitled "Automatic Control Flowing Monitoring (ACFM) for the ARM6: Choosing The Best Polynomials" by Paul M. Johnson, Anthony C. Sheller, Elizabeth C. Ward from Internal Document, National Security Agency on Dec. 9, 1996.

*Primary Examiner*—Richard L. Ellis
*Attorney, Agent, or Firm*—Gregory J. Gorrie

[57] ABSTRACT

A processing system includes a control flow monitor (CFM) checker for verifying a sequence of instructions performed by a pipelined processor (101). The CFM checker provides fail safe assurance against run-time errors in the sequence of instructions performed by a processor. The CFM checker verifies instruction sequence during run-time within 32 instruction cycles. The processing system provides an improved system and method having a CFM checker which minimizes wasted instruction cycles when performing branch instructions in a software program. Using a prefetch capability of an instruction pipeline and storing fixwords sequentially in memory, eliminates unnecessary instructions to fetch fixword values from external tables, thereby saving instructions and instruction cycles.

17 Claims, 3 Drawing Sheets

SYSTEM FOR MONITORING PROGRAM FLOW UTILIZING FIXWORDS STORED SEQUENTIALLY TO OPCODES

FIELD OF THE INVENTION

This invention relates in general to the field of a control flow monitor, in particular to a control flow monitor in a processor and more particularly to a control flow monitor in a pipelined processor.

BACKGROUND OF THE INVENTION

Trends in computing have clearly defined the need for reliability for both commercial and military computing. As software plays an increasing role in computing systems, reliable methods of determining the correct sequencing and integrity of instructions is needed.

Present systems experience large performance degradation in processing throughput when using existing control flow monitor (CFM) and signatured instruction streams (SIS) techniques to monitor the sequencing and correctness of instructions. Because of large processing demands placed on existing processors due to existing CFM and SIS methods, systems needing CFM and SIS features and non-CFM and SIS performance need more expensive, faster processors to meet system requirements.

Some existing systems monitor the sequence of instructions by performing at least two independent operations on an instruction prior to executing the instruction and then comparing the results from each independent operation. A first operation is typically performed for each opcode of each instruction prior to executing instructions (e.g., opcodes) on the target processor. During the first operation, a predetermined bit is typically calculated for each opcode. Each predetermined bit is stored in memory along with the associated opcode. Each predetermined bit represents a parity bit based on the associated opcode and a state variable determined by the processing system which calculates the predetermined bit. Each instruction is typically comprised of an opcode and a predetermined bit. Then, a second operation is performed for each opcode during run-time when the opcode is fetched from memory. Typically, a run-time bit is determined by the second operation. Each run-time bit represents a parity bit based on the associated opcode and a state variable determined by the run-time processing system which calculates the run-time bit. In some systems, the predetermined bit and the run-time bits are compared for each instruction. When the bits compare, the processor continues processing by executing the opcode. When the bits fail to compare, the processor is typically reset or interrupted to allow error detection processing to continue.

A problem in existing systems is the overhead processing associated with determining the run-time bit for an opcode after a program branch. In many existing systems, having a control flow monitor determine a runtime bit after a program branch requires extra program instructions to fetch a fixword from a table of fixwords. Extra program instructions increase the overhead processing associated with determining a run-time bit after a program branch.

Thus, what is needed is an improved system and method having improved processor performance. What is also needed are an improved system and method for verifying a sequence of instructions during run-time of a computer program. Also needed is an improved system and method for determining a run-time bit based on an opcode for a branch instruction.

SUMMARY OF THE INVENTION

In accordance with one of the preferred embodiments, the present invention provides a method of control flow monitoring. The method comprises the step of determining when a first opcode creates a program branch to a second opcode location. The second opcode location is determined by the first opcode. The second opcode location is associated with a second opcode. The method also includes the step of adding a fixword and the second opcode to determine a new opcode. The fixword being stored sequentially to the first opcode. The method also includes the step of performing an operation on the new opcode to verify a processing sequence associated with the second opcode.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, an improved system and method having improved processor performance. The present invention also provides an improved system and method for verifying a sequence of instructions during run-time of a computer program. The present invention also provides an improved system and method for determining a run-time bit based on an opcode for a branch instruction.

Figure 1:
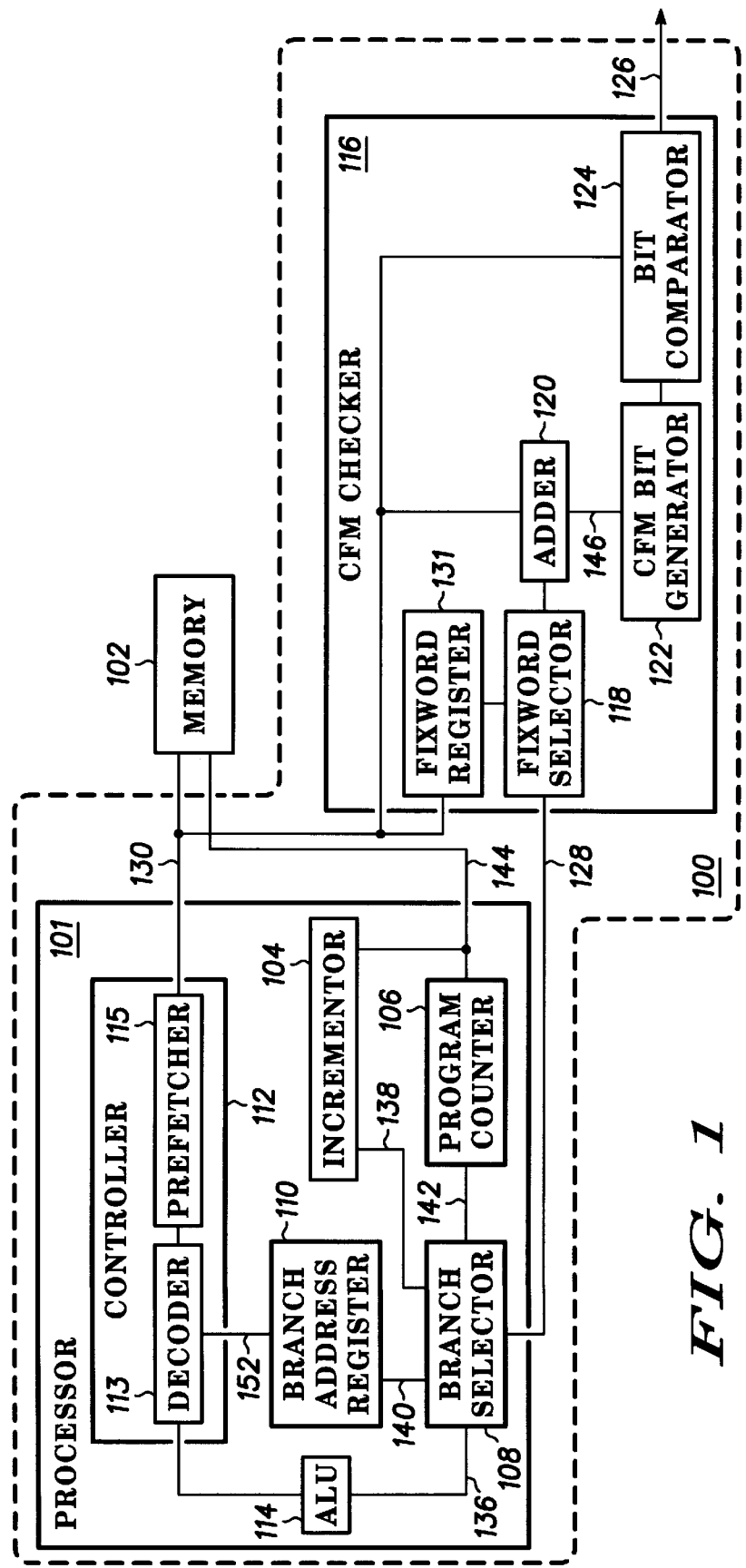
FIG. 1 illustrates a hardware block diagram of a processing system in accordance with a preferred embodiment of the present invention.

FIG. 1 illustrates a hardware block diagram of a processing system in accordance with a preferred embodiment of the present invention. Processing system 100 is comprised of two primary elements, processor 101 and control flow monitor (CFM) checker 116.

Processor 101 is coupled to memory 102 and CFM checker 116. Processor 101 is primarily comprised of controller 112, arithmetic logic unit 114, branch address register 110, branch selector 108, incrementor 104 and program counter 106. Among other things, processor 101 controls the fetching and execution of software program instructions from memory 102. Processor 101 also provides control to CFM checker 116. Control of CFM checker 116 includes, among other things, enabling and disabling fixword selector 118. Processor 101 is preferably implemented as a reduced instruction set computer (RISC) processor.

Preferably, memory 102 stores opcodes and predetermined CFM bits based on each opcode. Preferably, each instruction opcode has one predetermined control flow monitor bit associated therewith. Memory 102 is preferably implemented as a random access memory.

Incrementor 104 increments the address output (e.g., the current address) from program counter 106. Incrementor 104 outputs the next address to be accessed in memory 102 when the sequence of instructions is being performed sequentially (e.g., no branch instruction is being performed). Incrementor 104 is preferably implemented as an adder.

Program counter 106 stores the address currently being addressed in memory 102. Program counter 106 is preferably implemented as a register.

In the preferred embodiment, branch selector 108 accepts three inputs and provides two outputs. The inputs are condition code signal 136, incremented address 138 and branch address 140. The outputs are next address 142 and branch taken signal 128. When condition code signal 136 is asserted, branch selector 108 forwards branch address 140 to program counter 106 via next address 142 and asserts branch taken signal 128. When condition code signal 136 is not asserted, branch selector 108 forwards incremented address 138 to program counter 106 via next address 142 and does not assert branch taken signal 128. Branch selector 108 is preferably implemented as decision logic.

Branch address register 110 is preferably one of sixteen address registers. In the preferred embodiment each register of the sixteen address registers may store an address which references a location in memory 102. Preferably, when the location is referenced by a branch address register, the location contains an instruction stored in memory 102 of the destination program.

Controller 112 contains two primary elements. The first element is decoder 113 and the second element is prefetcher 115. In the preferred embodiment, decoder 113 and prefetcher 115 perform in combination to function as, among other things, a portion of the instruction pipeline for processor 101. Controller 112 also contains a reset input (not shown in FIG. 1) which monitors alarm signal 126 of CFM checker 116. Decoder 113 decodes the opcodes fetched by prefetcher 115. Decoder 113 preferably accesses branch address register 110 using indirect register addressing. Decoder 113 is preferably implemented similar to decoders found in the prior art. Decoder 113 provides control to arithmetic logic unit (ALU) 114 for performing mathematical and logical operations on input data.

In the preferred embodiment, examples of mathematical operations performed by ALU 114 are addition, subtraction, multiplication, division, and other types of mathematical operations. Examples of logical operations are logical and, logical or, logical exclusive-or, and other types of logical operations.

ALU 114 is preferably coupled to decoder 113 and branch selector 108. ALU 114 performs mathematical and logical operations on input data and outputs data and control signals. The mathematical and logical operations performed by ALU 114 are preferably provided by decoder 113 in the form of control signals. When the operations performed by ALU 114 cause a branch condition, ALU 114 outputs condition code signal 136 to branch selector 108. ALU 114 is preferably implemented similar to ALUs found in the prior art.

Prefetcher 115 is coupled to decoder 113 and memory 102. Prefetcher 115 is coupled to memory 102 via instruction bus 130. Prefetcher 115 fetches program instructions (e.g., opcodes and predetermined CFM bits) from memory 102. Prefetcher 115 stores opcodes until they are requested by decoder 113. Prefetcher 115 is preferably implemented similar to prefetchers found in pipelined processors found in the prior art.

In the preferred embodiment, CFM checker 116 is primarily coupled to processor 101 and memory 102. CFM checker 116 stores predetermined CFM bits fetched via instruction bus 130 by prefetcher 115. Additionally, CFM checker 116 determines a run-time CFM bit based on opcodes fetched onto instruction bus 130 by program counter 106. CFM checker 116 is principally comprised of fixword register 131, fixword selector 118, adder 120, control flow monitor bit generator 122, and bit comparator 124. CFM checker 116 is coupled to memory 102 via instruction bus 130.

Among other things, instruction bus 130 carries instructions from memory 102 to CFM checker 116. Each instruction is preferably comprised of an opcode and a predetermined CFM bit or a fixword. The predetermined CFM bit represents a parity bit preferably determined by performing an operation on the opcode.

Fixword selector 118 is coupled to fixword register 131 and adder 120 within the CFM checker 116. Fixword selector 118 is coupled to branch selector 108 via branch taken signal 128. Preferably, when enabled by branch taken signal 128, fixword selector 118 accepts a fixword (discussed below) from fixword register 131 and provides the fixword to adder 120. Fixword selector 118 is preferably implemented as multiplier which selects either fixword register 131 or a null value.

In the preferred embodiment, a fixword is a number having the same number of bits as an opcode. In the present invention, a fixword is preferably predetermined for each opcode which may cause a program branch. When an opcode causes a program branch, a fixword is added to the opcode at the "branched to" location to form a new opcode. The new opcode may then be used by CFM bit generator 122 to determine a run-time CFM bit. Preferably, a fixword is stored sequentially after a branch instruction in memory 102. When a processor is pipelined as shown by processor 101, a fixword stored sequentially after a branch instruction is automatically fetched onto instruction bus 130 by program counter 106 during the execution of a branch instruction.

A preferred method of determining a fixword involves, among other things, assigning a linear sequence generator (LSG) state to each opcode representing a software program. Preferably, a unique, non-repeating LSG state is assigned to each opcode. The LSG state for the nth opcode is based on the LSG state of the n-$1^{st}$ LSG state and the opcode of $n^{th}$ instruction, where n represents an integer index assigned sequentially to each opcode and ranges from 1 to the total number of opcodes in the software program. The LSG state for the first opcode (n=1) is preferably based on the first opcode and LSG state zero (n−1=0), wherein LSG state zero is predetermined as a 32-bit value representing zero (e.g., LSG state(n−1)=LSG state(1−1)=LSG state(0)=0000 0000 0000 0000).

Determining the fixword associated with a branch instruction includes four values. The four values are the LSG state for the branch opcode (32-bits), the feedback bit (determined from the polynomial used by the LSG) of the LSG state for the branch opcode (1-bit), the opcode at the "branched to" location (32-bit), and the LSG state of the opcode immediately preceding the branched to opcode (32-bit). Preferably, the modulo-2 sum of these four values represents the 32-bit fixword which is stored sequentially to a program branch instruction (e.g., opcode and predetermined CFM bit).

In the preferred embodiment when fixword selector 118 is enabled, adder 120 performs a ones complement addition between the fixword provided by fixword selector 118 and the opcode previously stored in adder 120. Preferably, when adder 120 adds the fixword and the opcode, a new opcode is created representing a fixword adjusted opcode. When fixword selector 118 is enabled, the new opcode is forwarded to CFM bit generator 122. When fixword selector 118 is disabled, adder 120 passes the original opcode to CFM bit generator 122. Adder 120 is preferably implemented as a ones complement adder.

CFM bit generator 122 is coupled to adder 120 and bit comparator 124. In the preferred embodiment CFM bit generator 122 determines the LSG state of the current opcode by performing a LSG operation on the opcode and the previous LSG state (e.g., LSG state associated with the preceding opcode). CFM bit generator 122 then determines a run-time CFM bit based on the current LSG state. Preferably, CFM bit generator 122 then performs a hash operation on the current LSG state. The hash operation results in a single run-time CFM bit. A preferred method for determining the run-time CFM bit is to divide the LSG state (32-bit) by the polynomial, $$x^{32}+X^{27}+x^{18}+x^{17}+x^{15}+x^{13}+x^{10}+x^9+x^8+x^5+x^4+1$$

wherein x represents the taps of the 32-bit LSG state. Performing an exclusive-or operation on taps for the polynomial provides the run-time CFM bit.

Prior to executing an opcode by the processor, a predetermined CFM bit is determined for each opcode in a sequence of opcodes representing a software program. In the preferred embodiment, predetermined bits are determined by performing operations similar to those described for determining run-time CFM bits.

Bit comparator 124 is coupled to CFM bit generator 122 and instruction bus 130. In the preferred embodiment bit comparator 124 accepts two single bit inputs. One input from CFM bit generator 122 and one input from instruction bus 130. The bit input from instruction bus 130 is the predetermined CFM bit associated with the opcode stored in adder 120. Both the opcode stored in adder 120 and the predetermined CFM bit stored in bit comparator 124 are fetched onto instruction bus 130 from memory 102 by program counter 106. Preferably, bit comparator 124 compares the two input bits. When bit comparator 124 determines the predetermined CFM bit and run-time CFM bit fail to compare, alarm signal 126 is preferably output from bit comparator 124. In the preferred embodiment, alarm signal 126 serves as a reset for controller 112. In another embodiment, alarm signal 126 may serve, among other things, as an interrupt to processor 101.

In the preferred embodiment, instruction bus 130 is the primary bus connecting elements of processing system 100. Among other things, program instructions and CFM bits are fetched by program counter 106 onto instruction bus 130 for loading into system 100 elements.

Fixword register 131 is coupled to instruction bus 130 and fixword selector 118. Fixword register 131 is an element for temporarily storing the fixword associated with the next program instruction output on instruction bus 130. Preferably, a fixword is loaded into fixword register 131 by program counter 106. Fixword register 131 is loaded on each program instruction with either an opcode which is to be executed or a value which may be a fixword. When the instruction being executed in processor 101 is a branch instruction, then the value in the fixword register is a valid fixword and is added to the next opcode from memory 102 when the program branch is taken. When the branch is not taken, then fixword selector 118 adds a null value to the next opcode. Fixword register 131 is preferably implemented as a register.

Condition code signal 136 is a control signal output from ALU 114. When a program branch associated with a branch instruction is determined to be true by branch selector 108 (based on condition code signal 136), branch taken signal 128 is asserted. When the branch associated with a branch instruction is determined to be false by branch selector 108, branch taken signal 128 is not asserted.

Incremented address 138 is output from incrementor 104 and represents the address output by program counter 106 (e.g., current address 144) incremented by one program instruction. Incremented address 138 is input into branch selector 108. When no branch condition is taken, incremented address 138 represents the next instruction address which is fetched into prefetcher 115 from memory 102.

Branch address 140 is output from branch address register 110 and input to branch selector 108. Branch address 140 represents the address of the next instruction to be executed when branch selector 108 determines a branch condition is true. In the preferred embodiment, branch address 140 is the address in memory 102 of the next instruction fetched following a program branch.

Next address 142 is output from branch selector 108 and input to program counter 106. Next address 142 represents the next address to be accessed in memory 102.

Current address 144 is output from program counter 106 and input to memory 102. Current address 144 represents the address of the instruction currently being addressed in memory 102 by program counter 106.

Fixword adjusted opcode bus 146 connects adder 120 and CFM bit generator 122. In the preferred embodiment fixword adjusted opcode bus 146 is a 32-bit bus. Preferably the bus carries opcodes from adder 120 to CFM bit generator 122.

Branch address bus 152 couples decoder 113 to branch address register 110. Branch address bus 152 carries the indirect register address provided by decoder 113. In the preferred embodiment, the register address provided by decoder 113 selects one of sixteen registers provided by branch address register 110. The indirect address determined by decoder 113 and presented by branch address bus 152 indicates the branch address register containing the address of a branch instruction.

Figure 2:
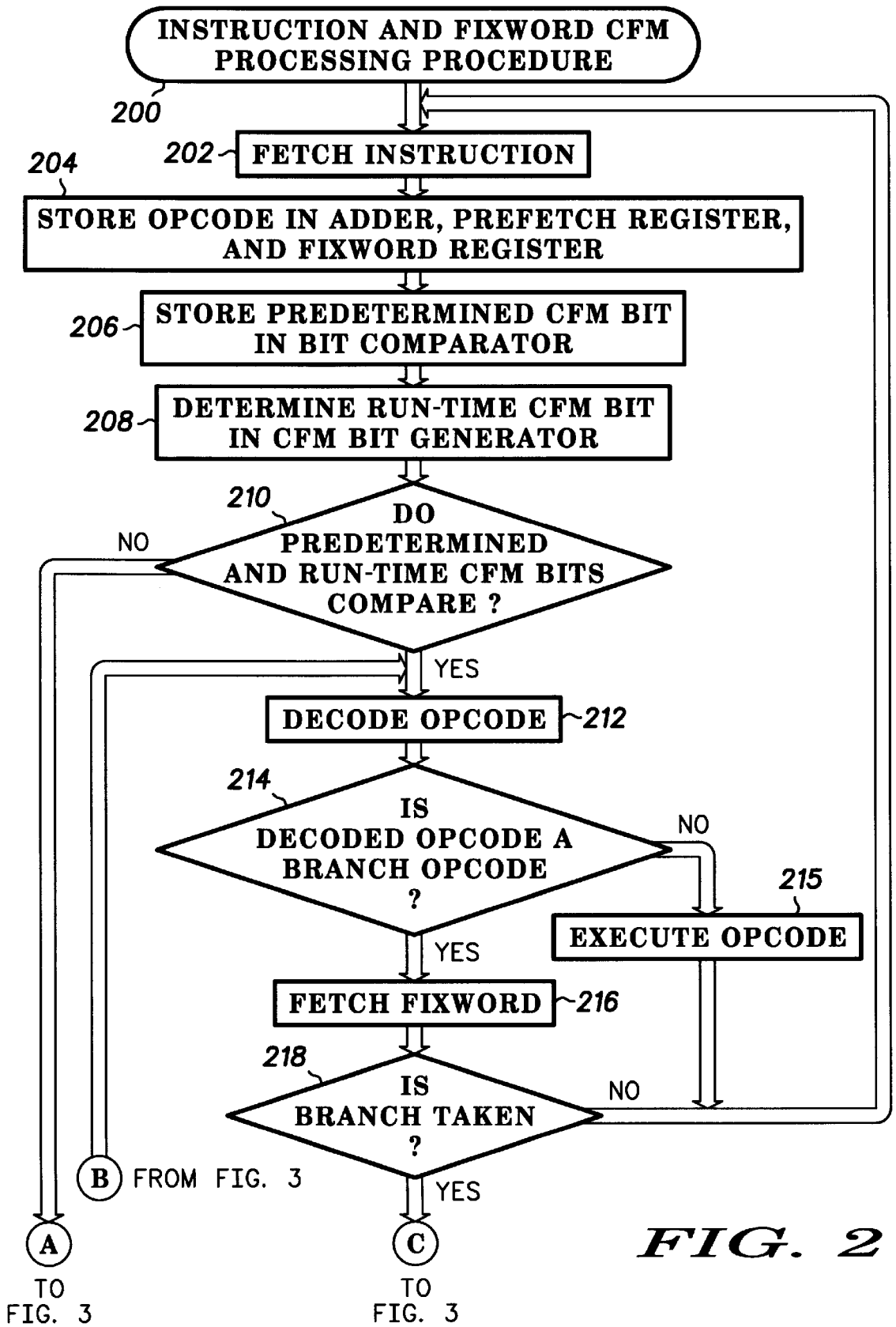
FIG. 2 and FIG. 3 are a flow chart for a control flow monitor procedure for processing instructions and fixwords in accordance with a preferred embodiment of the present invention.
Figure 3:
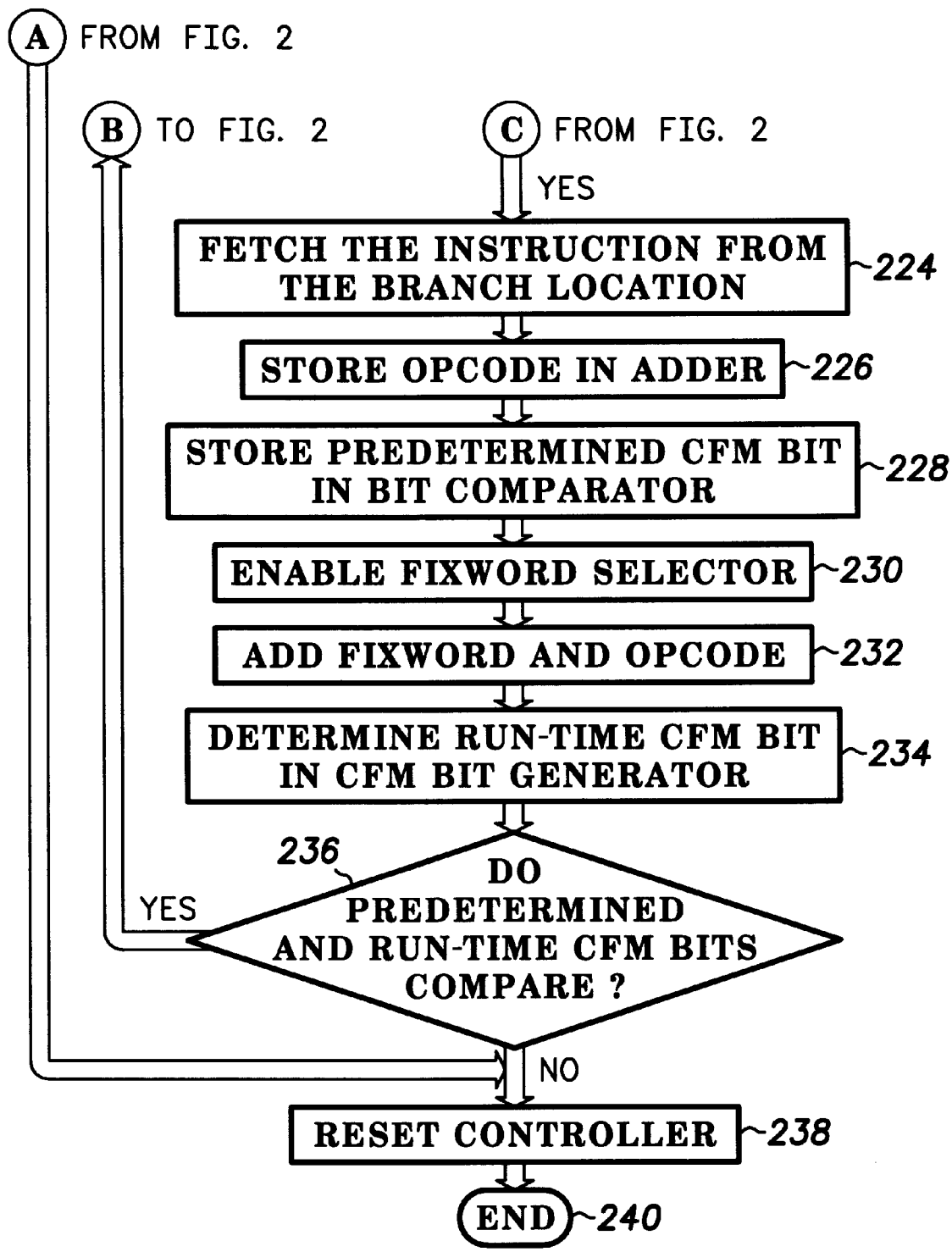

FIG. 2 and FIG. 3 are a flow chart for a control flow monitor procedure for processing instructions and fixwords in accordance with a preferred embodiment of the present invention. Preferably, procedure 200 is performed by a combination of a processor and a CFM checker. In the preferred embodiment, procedure 200 is performed for each instruction of a sequence of instructions prior to the instruction being executed by the processor. The sequence of instructions represents a software program performed by the processor.

In task 202, an instruction (e.g., opcode and predetermined CFM bit) is fetched. In the preferred embodiment the prefetcher receives an instruction from memory onto the instruction bus. Preferably, the instruction is fetched by the program counter.

In task 204, the opcode is stored in the adder, the prefetch register, and the fixword register. In the preferred embodiment, the opcode portion of the instruction is fetched into the adder, the prefetch register (not shown in FIG. 1, preferably contained within prefetcher 115 (FIG. 1)), and fixword register by the program counter.

In task 206, the predetermined CFM bit is stored in the bit comparator. In the preferred embodiment, the predetermined CFM bit portion of the instruction fetched by the program counter is stored in the bit comparator.

In task 208, a run-time CFM bit is determined in the CFM bit generator. In the preferred embodiment, the runtime CFM bit is determined as described above in the discussion on CFM bit generator 122 (FIG. 1). When the run-time CFM is generated, the bit is input to the bit comparator.

In task 210, a check is performed to compare the predetermined and run-time CFM bits. In the preferred embodiment, when the two bits compare, task 212 is performed. When the two bits do not compare, task 238 is performed.

In task 212, the opcode is decoded. In the preferred embodiment, the opcode is decoded by the decoder. In the preferred embodiment, the decoder outputs control signals based on the decoded opcode. For example, when a decoded opcode is a branch type opcode, the decoder causes the branch selector (task 218) to perform a comparison of the condition code from the ALU to the opcode control field. The branch selector then outputs a branch taken signal based on the comparison. In one embodiment, when the ALU asserts the condition code signal, the signal enables the branch selector to accept an address from the branch address register.

In task 214, a check is performed to determine when the decoded opcode is a branch instruction. In the preferred embodiment, when the decoder determines the opcode is not a branch instruction, task 215 is performed. When the decoder determines the decoded opcode is a branch instruction, task 216 is performed.

In task 215, the opcode is executed. In the preferred embodiment, the opcode decoded by the decoder is executed by the ALU. Additionally, since the opcode which is executed is not a branch type opcode, the value stored in the fixword register (task 204) is not added to the opcode stored in the adder. When task 215 is complete, task 202 is performed.

In task 216, a fixword is fetched. In the preferred embodiment, a fixword is fetched from memory by the program counter into the prefetch register (not shown in FIG. 1) and the fixword register.

In task 218, the ALU determines when the branch is taken. In the preferred embodiment, when the ALU executes the opcode and determines the opcode produces a branch condition, the branch selector asserts the branch taken signal and task 224 is performed. When a branch condition is not taken, the branch selector does not assert the branch taken signal and task 202 is performed. When the branch opcode executed in task 218 does not a cause a branch condition, the value stored in the fixword register (task 216) is not added to the opcode stored in the adder.

Additionally, in task 218, the decoder tags the fixword (task 216) as a non-executable (no-op) opcode. In the preferred embodiment, the fixword fetched in task 216 is forwarded from the prefetcher to the decoder.

In task 224, the instruction from the branch location is fetched. In the preferred embodiment, the opcode decoded in task 212 causes the prefetcher to receive the instruction at the "branched to" location. Preferably, the address of the instruction at the branched to location is forwarded by the branch selector to the program counter. The branch selector is preferably conditionally enabled by the condition code signal.

In task 226, the opcode is stored in the adder. In the preferred embodiment, task 226 is similar to task 204.

In task 228, the predetermined CFM bit is stored in the bit comparator. In the preferred embodiment, task 228 is similar to task 206.

In task 230, the fixword selector is enabled. In the preferred embodiment, the fixword selector is enabled by the branch selector. Preferably, the branch selector enables the fixword selector to accept the fixword stored in the fixword register (task 216) and to output the fixword to the adder.

In task 232, the fixword is added to the opcode. In the preferred embodiment, the adder performs a ones complement addition between the opcode from task 226 and the fixword output from the fixword selector. The adder outputs a new opcode which is input into the CFM bit generator. Preferably, a "new opcode" is also entitled as "fixword adjusted opcode".

In task 234, a run-time CFM bit is determined in the CFM bit generator. In the preferred embodiment, task 234 is similar to task 208.

In task 236, a check is performed to compare the predetermined and run-time CFM bits. In the preferred embodiment, task 236 is similar to task 210.

In task 238 the controller is reset. In the preferred embodiment, a reset signal (alarm output) is asserted from the bit comparator and is input to the controller. Preferably, a built in self-test is performed by the controller when the reset signal is asserted.

In the preferred embodiment, tasks 202–238 may be performed simultaneously. For example, fetching instructions and fixwords from memory into the prefetcher and elements of the CFM checker may be performed simultaneously with the decoding and execution of instructions in the decoder and ALU, respectively.

Thus, what has been shown are an improved system and method having improved processor performance. What has also been shown are an improved system and method for verifying a sequence of instructions during run-time of a computer program. Also shown are an improved system and method for determining a run-time bit based on an opcode for a branch instruction.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of monitoring program flow comprising the steps of:

determining when a first opcode creates a program branch to a second opcode location, said second opcode location being determined by said first opcode, said second opcode location being associated with a second opcode;

adding a fixword and said second opcode to determine a new opcode, said fixword being stored sequentially to said first opcode; and performing an operation on said new opcode to verify a processing sequence associated with said second opcode.

2. A method of monitoring program flow as claimed in claim 1 further comprising the step of:

determining when said processing sequence of said second opcode is verified;

when said processing sequence is verified, executing said second opcode; and when said processing sequence fails to be verified, refraining from executing said second opcode.

3. A processing system for processing a series of instructions from a memory, said series of instructions having predetermined fixwords stored sequentially in said memory after branch instructions, each instruction of said series of instructions comprising an opcode and a predetermined bit, the processing system comprising:

a bit generator for generating a first run-time bit based on a first opcode;

a bit comparator for comparing said first run-time bit with a first predetermined bit, said first predetermined bit being based on said first opcode, when said first run-time bit compares with said first predetermined bit, a first processing sequence associated with said first opcode being validated;

an arithmetic logic unit for determining when said first opcode causes a branch to a second opcode; and an adder for adding a predetermined fixword and said second opcode to determine a new opcode when said branch is taken, wherein said predetermined fixword is stored sequentially in said memory to said first opcode and said first predetermined bit, and wherein said bit generator generates a second run-time bit based on said new opcode, and wherein said bit comparator compares said second run-time bit and a second predetermined bit, said second predetermined bit being based on said second opcode, when said second run-time bit compares with said second predetermined bit, a second processing sequence associated with said second opcode being validated.

4. A processing system as claimed in claim 3 further comprising:

a prefetcher for fetching each instruction of said series of instructions, and for fetching each predetermined fixword of said predetermined fixwords; and a decoder having decoding opcodes for each instruction of said series of instructions, wherein a combination of said prefetcher and said decoder perform as an instruction pipeline for said processing system.

5. A processing system as claimed in claim 4 wherein said decoder includes means for determining when a branch opcode is executed by said arithmetic logic unit, and means for tagging said predetermined fixword as a non-executable opcode when said branch opcode fails to cause a program branch.

6. A processing system for processing a series of instructions from a memory, said series of instructions having predetermined fixwords stored sequentially in said memory after branch instructions, each instruction of said series of instructions comprising an opcode and a predetermined bit, the processing system comprising:

a bit generator for generating a first run-time bit based on a first opcode, said first opcode representing a first portion of a first instruction, said first instruction being further comprised of a first predetermined bit; and a bit comparator for comparing said first run-time bit with said first predetermined bit, when said first run-time bit and said first predetermined bit compare, a first processing sequence associated with said first opcode is verified.

7. A processing system as claimed in claim 6 further comprising:

an arithmetic logic unit for determining when said first opcode causes a branch to a second opcode.

8. A processing system as claimed in claim 7 further comprising:

an adder for adding a predetermined fixword and said second opcode to determine a new opcode when said branch is taken.

9. A processing system as claimed in claim 8 wherein said predetermined fixword is stored sequentially in said memory to said first opcode and said first predetermined bit, and wherein said bit generator generates a second run-time bit based on said new opcode, and wherein said bit comparator compares said second run-time bit and a second predetermined bit, said second predetermined bit being based on said second opcode, when said second run-time bit compares with said second predetermined bit, a second processing sequence associated with said second opcode being validated.

10. A method of control flow monitoring comprising the steps of:

performing a linear sequence generator operation for a first instruction from a memory, said first instruction being comprised of a first opcode and a first predetermined control flow monitor bit, said first predetermined control flow monitor bit based on said first opcode, said first opcode being used to determine a first run-time control flow monitor bit;

comparing said first run-time control flow monitor bit and said first predetermined control flow monitor bit to verify a first processing sequence associated with said first opcode, when said first run-time control flow monitor bit and said first predetermined control flow monitor bit compare, performing a first executing step for said first opcode, wherein said first executing step further includes the step of determining when said first opcode causes a first program branch to a second instruction, said second instruction being comprised of a second opcode and a second predetermined control flow monitor bit;

adding a fixword and said second opcode to determine a fixword adjusted opcode;

performing said linear sequence generator operation on said fixword adjusted opcode to determine a second run-time control flow monitor bit based on said second opcode; and comparing said second run-time control flow monitor bit and said second predetermined control flow monitor bit to verify a second processing sequence associated with said second opcode, when said second run-time control flow monitor bit and said second predetermined control flow monitor bit compare, performing a second executing step for said second opcode.

11. A method as claimed in claim 10 wherein said comparing step for said first run-time control flow monitor bit and said first predetermined control flow monitor bit is followed by the step of:

refraining from performing said first opcode when said first processing sequence fails to verify.

12. A method as claimed in claim 10 wherein said comparing step for said second run-time control flow monitor bit and said second predetermined control flow monitor bit is followed by the step of:

refraining from performing said second opcode when said second processing sequence fails to verify.

13. A method as claimed in claim 10 wherein said executing step for said second opcode further includes the step of:

determining when said second opcode causes a second program branch to a third instruction, said third instruction being further comprised of a third opcode and a third predetermined control flow monitor bit, and wherein when said second opcode causes said second program branch to said third opcode, further performing the steps of:

adding a second fixword and said third opcode to create a second new opcode;

performing linear sequence generator operations on said second new opcode to determine a third run-time control flow monitor bit; and comparing said third run-time control flow monitor bit and said third predetermined control flow monitor bit to verify a third processing sequence associated with said third opcode.

14. A method of control flow monitoring comprising the steps of:

fetching a first instruction from a memory, said first instruction being comprised of a first opcode and a first predetermined control flow monitor bit, said first predetermined control flow monitor bit based on said first opcode;

performing a linear sequence generator operation for said first opcode to determine a first run-time control flow monitor bit, said first run-time control flow monitor bit based on said first opcode;

comparing said first run-time control flow monitor bit and said first predetermined control flow monitor bit to verify a first processing sequence associated with said first opcode, when said first run-time control flow monitor bit and said first predetermined control flow monitor bit compare, performing a first executing step for said first opcode, wherein said first executing step further includes the step of determining when said first opcode causes a first program branch to a second opcode;

fetching a fixword from said memory, said fixword being stored sequentially to said first instruction in said memory;

fetching a second instruction from said memory, said second instruction being comprised of said second opcode and a second predetermined control flow monitor bit, said second predetermined control flow monitor bit based on said second opcode, a location in said memory of said second instruction being determined by said first opcode;

adding said fixword and said second opcode to determine a fixword adjusted opcode;

performing said linear sequence generator operation on said fixword adjusted opcode to determine a second run-time control flow monitor bit based on said second opcode; and comparing said second run-time control flow monitor bit and said second predetermined control flow monitor bit to verify a second processing sequence associated with said second opcode, when said second run-time control flow monitor bit and said second predetermined control flow monitor bit compare, performing a second executing step for said second opcode.

15. A method as claimed in claim 14 wherein said comparing step for said first run-time control flow monitor bit and said first predetermined control flow monitor bit is followed by the step of:

refraining from performing said first opcode when said first processing sequence fails to verify.

16. A method as claimed in claim 14 wherein said comparing step for said second run-time control flow monitor bit and said second predetermined control flow monitor bit is followed by the step of:

refraining from performing said second opcode when said second processing sequence fails to verify.

17. A method as claimed in claim 14 wherein said executing step for said second opcode further includes the step of:

determining when said second opcode causes a second program branch to a third instruction, said third instruction being further comprised of a third opcode and a third predetermined control flow monitor bit, and wherein when said second opcode causes said second program branch to said third opcode, further performing the steps of:

fetching a second fixword, said second fixword stored sequentially to said second instruction;

fetching said third instruction;

adding said second fixword and said third opcode to create a second new opcode;

performing linear sequence generator operations on said second new opcode to determine a third run-time control flow monitor bit; and comparing said third run-time control flow monitor bit and said third predetermined control flow monitor bit to verify a third processing sequence associated with said third opcode.

* * * * *